United States Patent [19]

Takeda et al.

[11] Patent Number: 4,985,930
[45] Date of Patent: Jan. 15, 1991

[54] IMAGE DATA FILING SYSTEM AND IMAGE DATA CORRECTING METHOD

[75] Inventors: Haruo Takeda, Kawasaki; Toshihiro Hananoi, Kanagawa; Sachiko Kawachiya, Tokyo, all of Japan

[73] Assignee: Hitachi, Ltd., Tokyo, Japan

[21] Appl. No.: 246,978

[22] Filed: Sep. 20, 1988

[30] Foreign Application Priority Data

Sep. 24, 1987 [JP] Japan .................................. 62-237125
Apr. 22, 1988 [JP] Japan .................................. 63-98107

[51] Int. Cl.⁵ .............................................. G06K 9/00
[52] U.S. Cl. .......................................... 382/56; 382/57; 382/61; 358/452
[58] Field of Search ............................ 382/56, 57, 61; 358/452

[56] References Cited

U.S. PATENT DOCUMENTS

| | | | |
|---|---|---|---|
| 4,559,644 | 12/1985 | Kataoka | 382/61 |
| 4,633,506 | 12/1986 | Kato | 382/56 |
| 4,748,678 | 5/1988 | Takeda et al. | 382/56 |
| 4,760,608 | 7/1988 | Suzuki | 358/452 |

Primary Examiner—Leo H. Boudreau
Assistant Examiner—Daniel Santos
Attorney, Agent, or Firm—Fay, Sharpe, Beall, Fagan, Minnich & McKee

[57] ABSTRACT

A document image to be corrected is read out from an image file which stores document images, converted into dots, and printed on a correction paper. An operator writes correction information on the correction paper which is in turn inputted to the image file system with an image reader. The image file system erases the dot image information of the image inputted with the image reader. The obtained correction information is synthesized with the original image read out from the image file. The synthesized corrected image is stored in the image file.

14 Claims, 12 Drawing Sheets

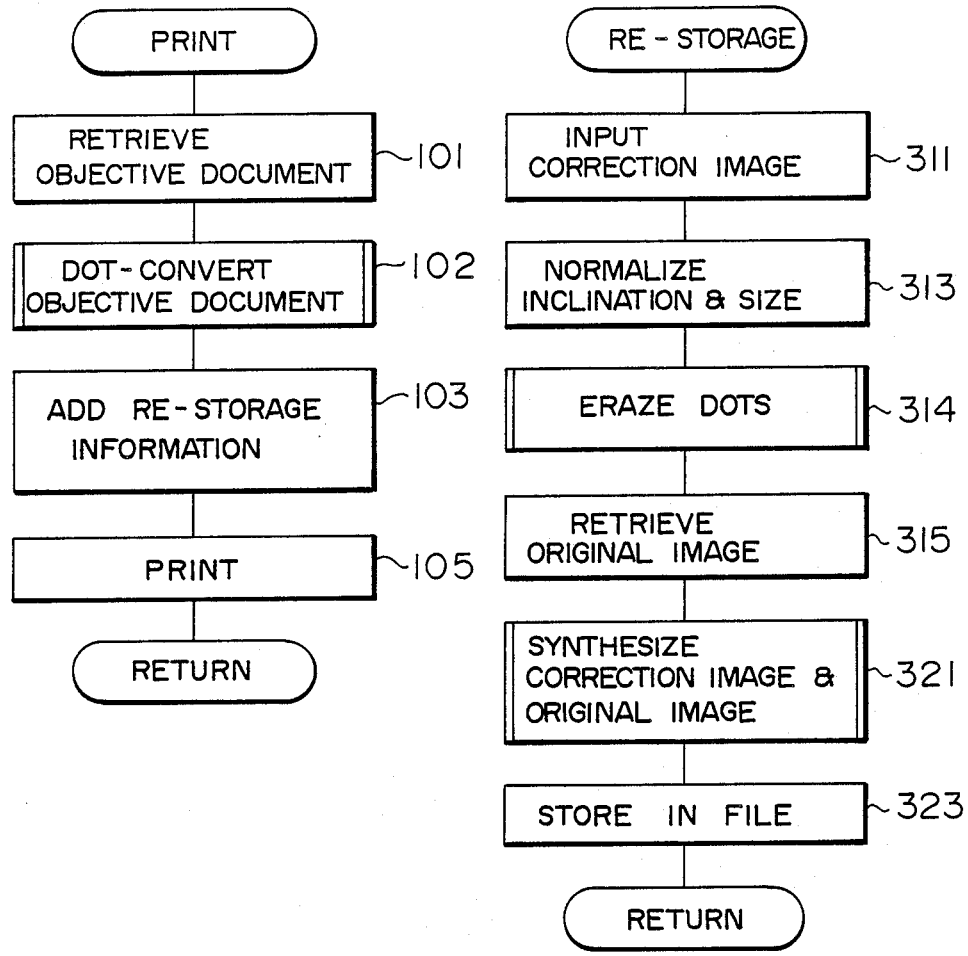

IMAGE DATA FILING SYSTEM AND IMAGE DATA CORRECTING METHOD

CROSS REFERENCE TO RELATED APPLICATION

U.S. Pat. No. 4,748,678 entitled "Method of Storing and Retrieving Image Data" and issued to Haruo TAKEDA et al discloses a technique wherein an origianl image read out of an image file is printed out to add information thereto, and the original image with the additional information is again inputted to the system to discriminate a different part between the original image and the newly inputted image and pick up the additional information.

BACKGROUND OF THE INVENTION

1. Field of the Invention

The present invention relates to an image data filing system and more particularly, to an image data filing system suitable for correcting an image stored in the file and re-storing the corrected image.

2. Description of the Prior Art

Document image file systems (electronic file systems) utilizing large capacity optical disks have recently become noticeable as the new means for document management. Optical disks are large in capacity and capable of recording image data so that document image information such as design layouts, literatures, contracts and etc. can be stored therein. As an example of systems of this kind, there is known, for example, a system disclosed in a magazine "Nikkei Electronics" Mar. 28, 1983, pp. 105 to 120.

It becomes sometimes necessary to partially correct the image data, e.g., design layouts or the like, already stored in such an image file system and re-store the corrected image data. According to the conventional system, an already stored image is made corrected through the method whereby the stored image is first printed out and applied to correction on the printed paper, and the corrected image is read by an image input device to store it in the image file as new image data in place of the image data before the correction.

The conventional system, however, does not consider image quality deterioration resulting from image printing and inputting operations, thus posing a problem that as an image is frequently applied to correction, the quality of such an image, particularly the image portion where correction was not applied, gradually deteriorates. More specifically, since the pixel densities of a printer and an image input device used in such a system are different to each other in most cases, the size of an image such as design layouts is reduced or magnified every correction operation in order to make the sizes of the original image and the corrected image coincide with each other. In addition, since there are digital-/analog conversion errors at the printer and image input device, line information of the corrected image is degraded to thus result in distorted lines and increased noises. If the same image data are applied to correction n times, the original image information will have undergone the image input device n+1 times and the printer n times. Consequently, as n becomes large, the image quality deteriorates more remarkably.

SUMMARY OF THE INVENTION

It is an object of the present invention to provide an image data filing system capable of correcting an image already registered or stored in an electronic file as many times as necessary without deteriorating the image quality.

It is another object of the present invention to provide an image data correcting method whereby a portion of image data stored in an electronic file can be corrected easily.

The above objects are achieved by the present invention which provides an image data filing system comprising: means for retrieving original image data from a file, said original image data corresponding to image data inputted as correction image data through an image input device; pattern matching means for obtaining a difference between the inputted image data and the retrieved image data; synthesizing means for forming a synthesized and corrected image data using the difference image data obtained through pattern matching and the retrieved image data; and means for storing the synthesized image data in the file.

With the image data filing system constructed as above, a difference between the correction image inputted from the image input device and the original image retrieved from the file is obtained by pattern matching means, the difference is synthesized with the original image by synthesizing means to form a new corrected image. The new corrected image includes the corrected portion and the non-corrected portion which were both applied to the image input device only once, because the corrected portion is additional information not present at printing-out of the original image which constitutes the non-corrected portion applied to the image input device only once and read from the file. Therefore, according to the present invention, even if a same image is applied to correction n times, information regarding both the corrected and non-corrected portions has undergone the image input device only once. The resultant image quality is evidently fine as compared to the conventional system wherein image correction of n times results in application to the image input device n+1 maximum times and to the printer n maximum times.

A further improved image data filing system according to the present invention comprises: first means for printing out original information onto a correction paper, the original information being obtained by subjecting first image data read out from an image file to a first conversion process; second means for reading the information containing correction information on the correction paper as second image data; third means for converting the second image data into third image data by subjecting the second image data to a second conversion process, the third image data being the second image data with the original information removed therefrom; and fourth means for forming a corrected image data using the first image data and the third image data.

An image data correcting method according to the present invention comprises the steps of: printing out original information onto a correction paper, the original information being obtained by subjecting first image data read out from an image file to a first conversion process; adding correction information to the correction paper and inputting the information containing the correction information on the correction paper as second image data; generating third image data by subjecting the second image data to a second conversion process, the third image data being the second image data with the original information removed therefrom; and forming fourth image data using the first image data and the third image data, the fourth image data being the third image a portion of which was removed therefrom.

The first conversion process, typically a process of converting an original image into dots, is employed to distinguish the original image information represented by the first image data from the correction information to be inputted by a user. In case of a dot conversion process, an original image is printed on a correction paper in the form of dot information so that a user can see the contents or positions of the already stored information (e.g., characters, figures) from the correction paper and add the new information and/or delete the contents of the already stored information. The dot conversion process thins black pixels of the original image at regular intervals to obtain dispersed black pixels. Therefore, if such regularly dispersed black pixels are removed (second conversion process) from the second image data obtained by reading the information on the correction paper, the correction information inputted by the user can be selectively extracted. Therefore, newly corrected image data can be obtained through logical OR operation between the correction information and the original image in the case of addition correction, and through removal of the deletion information represented by the correction information from the original image in the case of deletion correction. The newly corrected image thus obtained is made of the image data having undergone the input device only once so that the image quality is not practically deteriorated even after several times of correction. Besides the dot conversion process, the first conversion process in this invention may include other modifications such as a thinning or broadening process for line segments of an original image.

The foregoing and other objects, advantages, manner of operation and novel feature of the present invention will be understood from the following detailed description when read in connection with the accompanying drawings.

BRIEF DESCRIPTION OF THE DRAWINGS

FIG. 11 is a flow chart showing a print procedure using a correction paper in the second embodiment;

FIG. 12 is a flow chart showing the synthesizing procedure of the correction image with the original image in the second embodiment;

DESCRIPTION OF THE PREFERRED EMBODIMENTS

The invention will be detailed taking as an example an image file system using optical disks.

Figure 1:
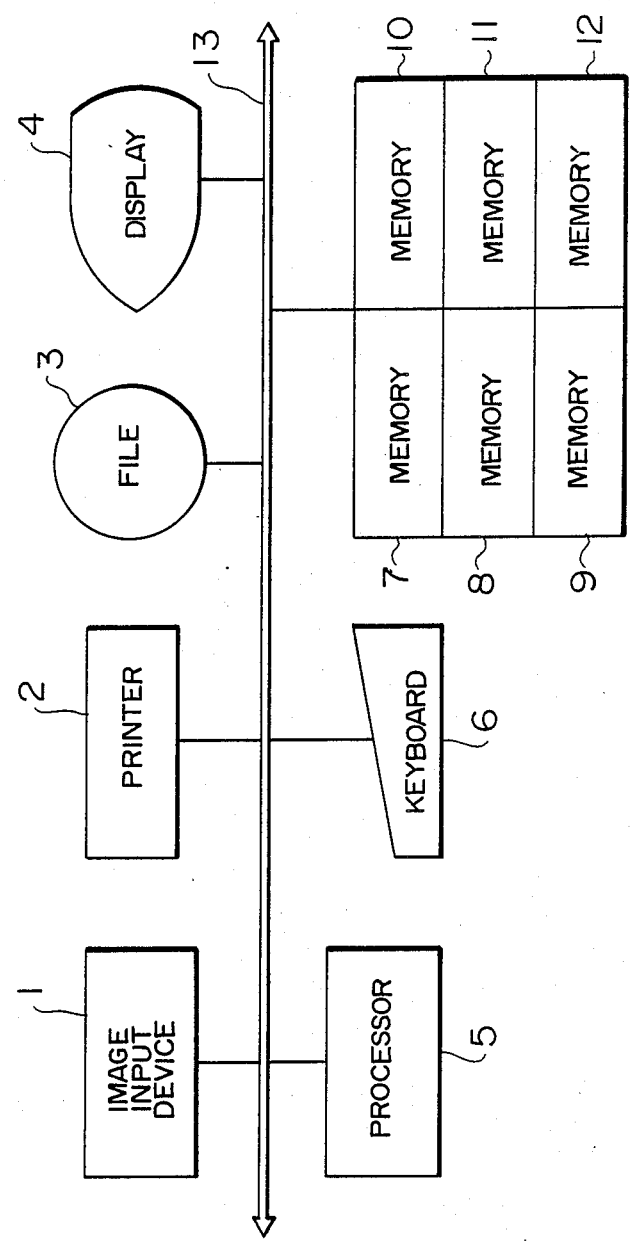
FIG. 1 is a block diagram showing an example of an image file system embodying the present invention.

FIG. 1 is a block diagram showing the overall arrangement of an image file system. The system comprises an image input device 1 such as an image scanner, television camera or the like, a printer 2 for printing image data, an image file 3 for use in storing/reading image data, a display 4 for displaying image data, a data processor 5 which operates upon programs stored therein, a keyboard 6 for inputting commands or the like, memories 7 to 12 for temporarily storing image data, and a bus 13 for interconnecting these components.

Figure 2:
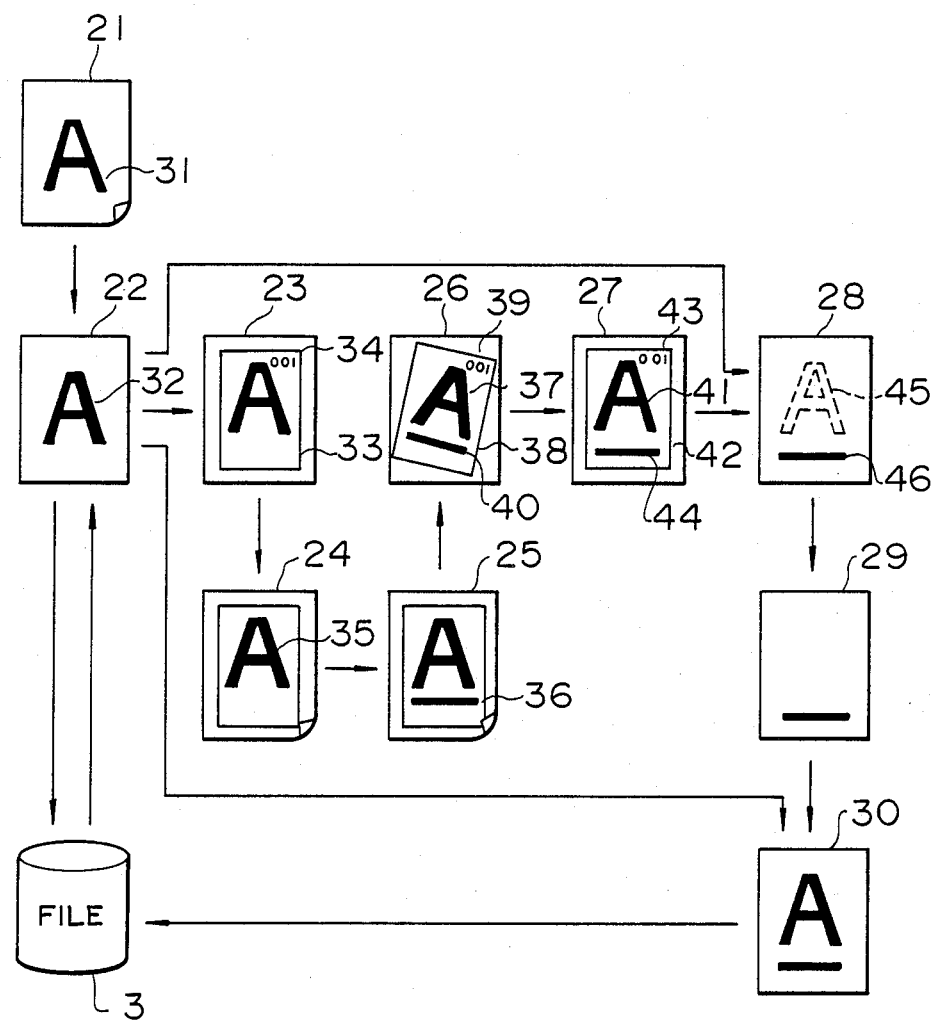
FIG. 2 is a schematic diagram showing the procedure starting from an initial storage of an original image to the re-storage of a corrected image according to a first embodiment of the present invention.

FIG. 2 is a schematic diagram showing the procedure starting from the initial storage of an original image to the re-storage of a corrected image according to a first embodiment of the present invention, wherein rectangular blocks represent image, those blocks with a peeled corner, e.g., indicated by 21, represent printed paper and other blocks represent image stored in memory.

Referring to FIG. 2, information 31 on a paper 21 is inputted into a memory 7 with the image input device 1, the original image 22 in the memory 7 is stored in the image file 3. Information such as key words for image retrieval is inputted with the keyboard 6 and stored in the image file 3 in one-to-one correspondence with the image 22.

Figure 3:
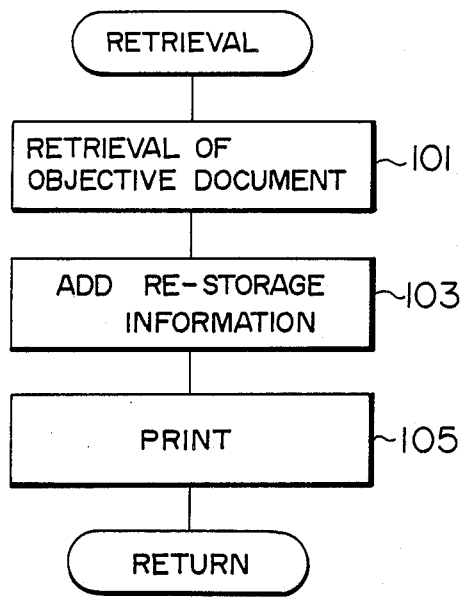
FIG. 3 is a flow chart for a program performing the procedure of retrieving an original image.

If an image stored in the image file according to the above procedure becomes necessary to be corrected, the program illustrated in FIG. 3 is executed. At step 101, upon input of the number, key word or the like of the image to be corrected, the image retrieved from the image file 3 is stored in the memory 7. This original image 22 per se may be printed out in the same manner as in the conventional system. However, to facilitate the pattern matching process to be described later which is performed during the correction processes, it is preferable to add at step 103 re-storage information such as a rectangular frame 33 for alignment purpose, a key word 34 for image retrieval purpose, and the like, to the original image 22. The rectangular frame 33 may be replaced by other marks representative of the image position, and the key word 34 may be replaced by other expression such as a bar code, a character in conformity with character recognition of JIS standards, or the like. The line segments constituting the rectangular frame 33, the key word 34 and the like are sequentially stored in the memory 7 at predetermined positions using line element patterns, character font patterns and the like. In the process of writing the rectangular frame, all black pixels of the image 23 outside the rectangular frame 33 may be converted into white pixels in order to facilitate the pattern matching process. At step 105, the image thus obtained as shown in FIG. 2 is printed out on a correction paper 24 by the printer 2. In this embodiment, it is assumed that a user adds new information 36 to the information 35 on the paper 24 to thereby obtain a correction paper 25 whose image is intended to be re-stored in the image file.

Figure 4:
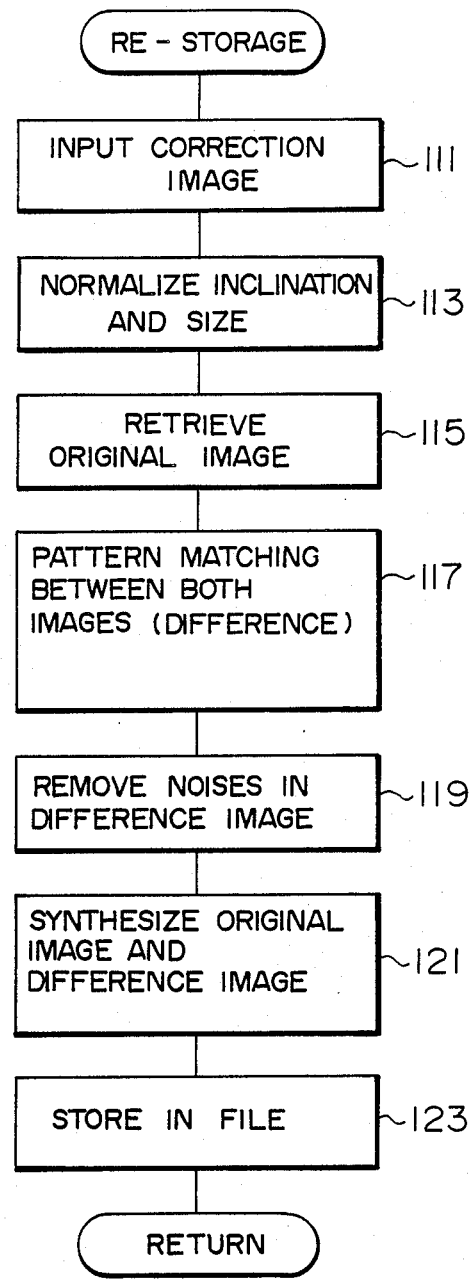
FIG. 4 is a flow chart for a program performing the procedure of re-storing the corrected image.

The process of re-storing a corrected image is performed in accordance with the program illustrated in FIG. 4. First, at step 111, the image of the corrected paper 25 is inputted in the memory 8 with the image input device 1 to thus obtain a correction image 26. The correction image 26 and the original image 23 have differences therebetween in their contents caused by the correction, and generally to some extent in their sizes and inclinations. Namely, since the pixel densities of the printer 2 and the image input device 1 are different in the strict sense of the word as discussed previously, the size of the image 26 becomes smaller than that of the image 23 if the printer 2 has a higher pixel density, and on the contrary the size of the image 26 becomes larger than that of the image 23 if the image input device 1 has a higher pixel density. In addition, generally there occurs an inclination of the image while a user manipulates the image input device 1. The process of normalizing the size and inclination of the correction image 26 relative to the size and inclination of the original image 23 by using the rectangular frame 38, and obtaining an image 27 will be described.

The normalization process of the size and inclination of the correction image 26 at step 113 includes two steps. At one step, the size and inclination of the image 26 are obtained by detecting four straight lines constituting the rectangular frame 38. At the other step, the image 26 undergoes the coordinate conversion so as to coincide the rectangular frame 38 of the correction image 26 with the rectangular frame 33 of the original image 23, and the image 26 with corrected size and inclination is stored in the memory 9. Various conventional methods may be used in detecting straight lines constituting the rectangular frame 38, one example of which is a known Hough conversion algorithm which is applied to this embodiment.

Figure 5:
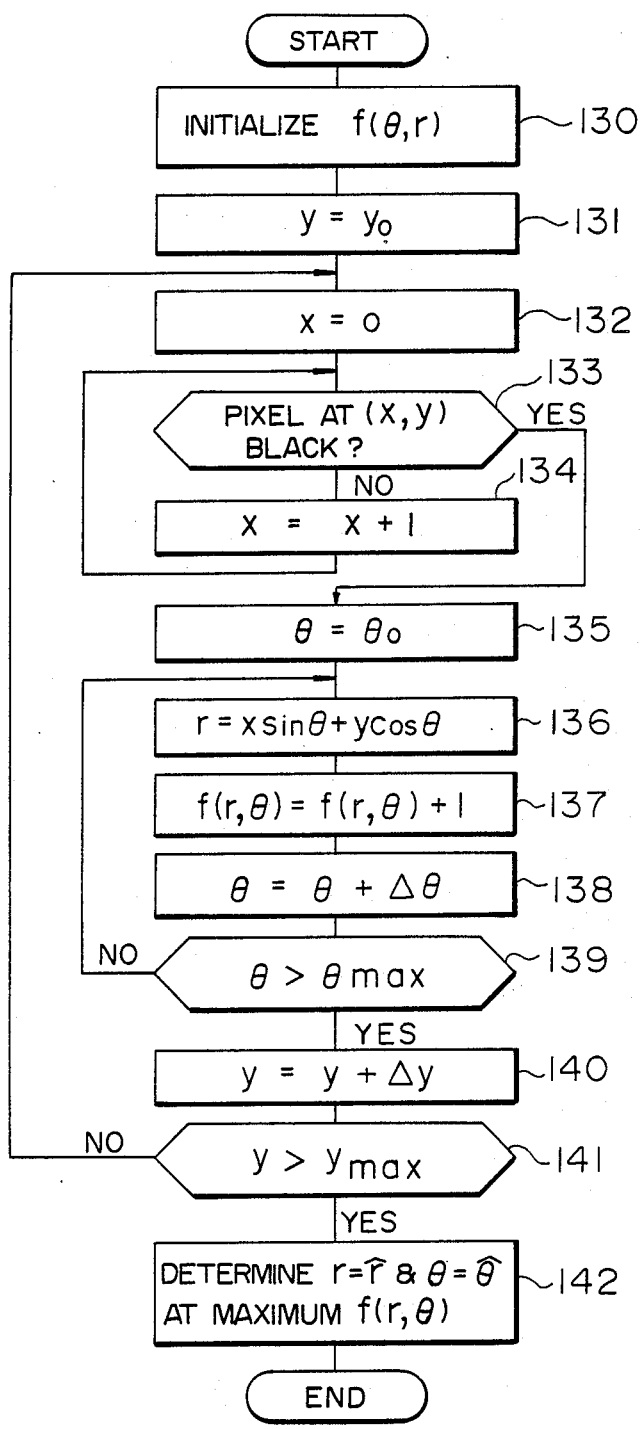
FIG. 5 is a flow chart for a program performing the procedure of locating straight lines contained in the original image.
Figure 6:
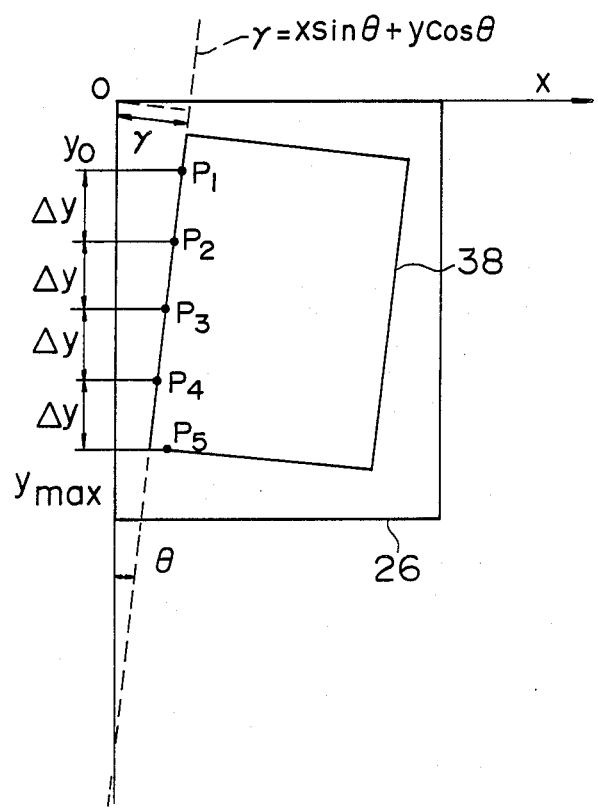
FIG. 6 illustrates how a straight line is located in the flow chart shown in FIG. 5.

FIG. 5 is a flow chart for a program detecting a left side vertical line among the four straight lines of the rectangular frame 38, and FIG. 6 illustrates the manner of detecting the vertical line. In FIG. 6, the formula of an objective straight line is expressed as $\gamma = x\sin\theta + y\cos\theta$ where $\gamma$ is a distance from an origin 0, and $\theta$ is an inclination of the straight line. The characteristic feature of the Hough conversion algorithm is the capability of detecting a straight line irrespective of particular portions of document information in the image. The outline of this algorithm is as follows: In the flow chart shown in FIG. 5, at steps 130 to 131 parameters are initialized, at steps 132 to 135 a candidate point, e.g., a black pixel P1 on a straight line is searched, at steps 136 to 140 combinations of $\theta\delta$ and $\theta$ for a straight line $\gamma = x\sin\theta + y\cos\theta$ passing through point P1 are obtained, and steps 132 to 141 are repeated to obtain a frequency distribution. The function $f(\gamma, \theta)$ indicates the number of candidate points on the straight line $\gamma = x\sin\theta + y\cos\theta$. For example, in FIG. 6, the value of $f(\gamma, \theta)$ of the straight line $(\gamma, \theta)$ passing through points P1 to P4 is "4", whereas the value of other straight lines $(\gamma, \theta)$ takes small value of 0 to 2. Therefore, the parameters $\gamma$ and $\theta$ which define a maximum $f(\gamma, \theta)$ are determined at step 142 to thus enable to obtain a straight line passing a maximum number of candidate points. The formulas of the right, upper and lower straight lines of the rectangular frame 38 can be obtained in the similar manner.

The upper left, upper right, lower left and lower right corner points of the rectangular frame 38 are then obtained from the intersections of the four straight lines, and the four corner points are respectively defined by (0, 0), (M1, N1), (M2, N2) and (M1+M2, N1+N2) in the new coordinate system having the upper left corner point as its coordinate origin.

Figure 7:
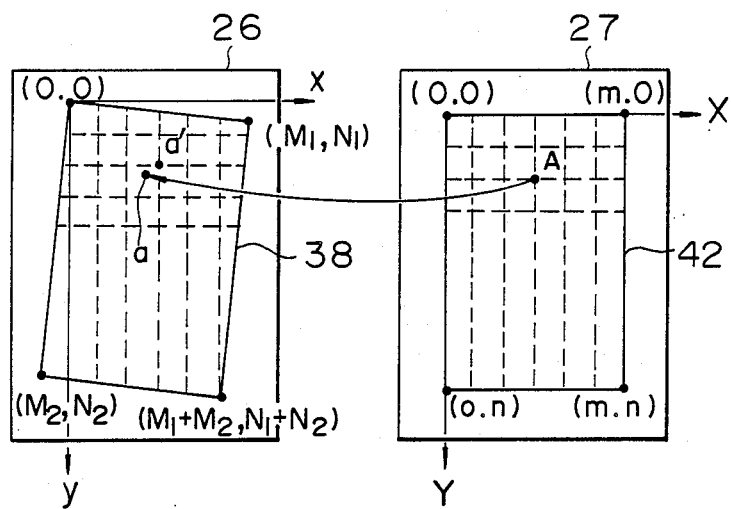
FIG. 7 illustrates image conversion associated with normalizing a correction image.

Next, the procedure of converting the correction image 26 into an image 27 by using the rectangular frame 38 will be described with reference to FIG. 7. The conversion from the image 26 into the image 27 can be expressed by $$\begin{pmatrix} X \\ Y \end{pmatrix} = \begin{pmatrix} M1/m & M2/n \\ N1/m & N2/n \end{pmatrix} \begin{pmatrix} x \\ y \end{pmatrix}$$

where (0, 0), (m, 0), (0, n) and (m, n) are four corner points of the rectangular frame of the original image 23, (x, y) is the coordinates of a pixel in the image 26, and (X, Y) is the coordinates of a corresponding pixel in the image 27. Using the transformed formula $$\begin{pmatrix} x \\ y \end{pmatrix} = \frac{1}{M1\,N2 - M2\,N1} \begin{pmatrix} mN2 & -mM2 \\ -nN1 & nM1 \end{pmatrix} \begin{pmatrix} X \\ Y \end{pmatrix}$$

which is equivalent to the above formula, a point (x, y) corresponding to each lattice point (X, Y), i.e., each point defined by an integer value X and Y, is obtained. The density of a point (X, Y) is determined as the density of a pixle nearest to the obtained point (x, y) to thus convert the image 26 into the image 27. For example, in FIG. 7, point A is converted into point a using the above formula, and the density of point a' nearest to point a is used as the density of point A.

Figure 8:
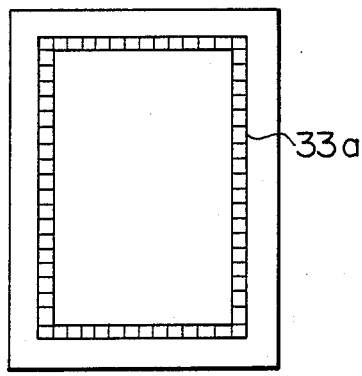
FIGS. 8 and 9 show modifications of a rectangular frame used in image correction.
Figure 9:
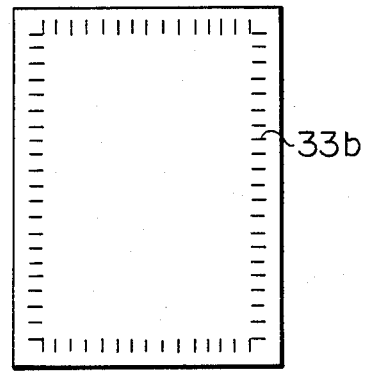

As the objective symbol for normalization of the size and inclination, the rectangular frame constructed of four straight lines has been used in the above embodiment. The normalization can be performed by other methods such as through matching of characteristic points added at the four corners, through matching of characteristic portions in an original document without adding specific symbols, and the like. Further, in the above embodiment, although the distortion caused by the difference of a pixel density between the printer 2 and the image input device 1 is assumed linear, the distortion will be non-linear in some cases. For example, such non-linear distortion may appear if an image scanner of the type the line sensor is driven by a motor is used as the image input device 1, because the drive speeds at the start and during the constant drive operation differs from each other. In such a case, instead of a rectangular frame, a frame 33a composed of squares as shown in FIG. 8 or a frame 33b composed of parallel lines like a bar code as shown in FIG. 9 may be added to the original image 22. A change in distance between parallel lines of the frame 33a or 33b is detected from the correction image 26. The detection results are used to divide the correction image 26 into plural portions so that each portion is subjected to the same conversion as described above, thus realizing a highly precise normalization.

Returning back to FIG. 4, at step 115 the original image 22 corresponding to the correction image 27 normalized by the above procedure is searched from the image file 3 and written in the memory 7. If another image has not been searched after the original image 22 was printed out, the above search process is not needed because the image 23 is already stored in the memory 7. The above search however becomes necessary for the case where a plurality of images are sequentially printed out and corrected thereafter to sequentially re-store the corrected images. The key word may be inputted by a user to search an original image. However, the key word 34 such as a bar code, OCR-B fonts or the like added to the image 23 may be used to search an original image. Since the key word 43 is being stored in the memory 8 after the correction image was read and normalized, this key word is recognized by the processor unit 5. A method of searching an image from the image file using a given key word and storing the image in a memory is known in the conventional system, so that the description therefor is omitted herein.

Next, a difference image 27 is obtained through pattern matching between the original image 22 stored in the memory 7 at the search process and the correction image 27 stored in the memory 9 at the normalization process, and the difference image 27 is stored in the memory 10. The above procedure performed at step 117 will be described below. The difference image 28 is formed by comparing pixels at the same coordinates of the images 27 and 22 and generating a white pixel at the position where both the pixels agree with each other and a black pixel at the position where both the pixels do not agree. For instance, the information 44 is not present on the image 22 so that the comparison result is a disagreement and the information 44 per se becomes the information 46 on the image 28. At this stage, the rectangular frame 42 and the key word 43 are erased by changing the black pixels thereof to white pixels. Although most of the information 41 coincides with the information 32, there is a local area where the information 41 and the information 32 do not agree with each other because they have undergone the printer 2 and the image input device 1. Thus, noise information 45 may be present on the image 28.

At step 119, the noise components are eliminated from the difference image 28 to obtain a difference image 29 which is then stored in the memory 11. This process can be achieved by the following method by utilizing a general feature that noises 45 have a narrower line width than that of the correction information 46. In particular, black pixel areas are first reduced in size to make the black pixel area with a narrower line width disappear. Such a reduction process can be achieved by performing the following formula for all coordinate values x and y:

$$f'(x, y) = f(x, y) \wedge f(x+1, y) \wedge f(x, y+1) \wedge f(x+1, y+1)$$

where $f(x, y)$ is the density of a pixel at the coordinates $(x, y)$ of the difference image 29. This conversion formula means that the density of each pixel in the difference image 28 is replaced by a logical AND density of adjacent four pixels including the pixel now concerned. In case of a binary image having white and black pixels alone, if at least one of the adjacent pixels is white, the pixel now concerned is replaced by a white pixel. In other words, the border of a black pixel area is narrowed by changing a portion of black pixels to white pixels. Next, the size of the black pixel area not disappeared by the reduction process is magnified to restore the original size of the black pixel area. Such a magnification process can be achieved by performing the following formula for all coordinate values x and y:

$$f''(x, y) = f(x, y) \vee f(x+1, y) \vee f(x, y+1) \vee f(x+1, y+1)$$

This conversion formula means that the density of each pixel of the difference image 28 reduced in size by the reduction process is replaced by a logical OR density of adjacent four pixels. In case of a binary image, if at least one of adjacent four pixels is black, the pixel now concerned is regarded as black. In other words, the border of the black pixel area is magnified by changing a fraction of white pixels to black pixels. In this embodiment, the densities of four adjacent pixels have been used for the reduction and magnification processes. However, many adjacent pixels, such as 9 pixels, 16 pixels may be used to make more noise information disappear.

At step 121, the difference image 29 stored in the memory 11 and the original image stored in the memory 7 are synthesized, and the synthesized image is stored in the memory 12. In this synthesizing process, pixels at corresponding positions of the image 29 and the image 22 are compared, and the higher density is used as the pixel density of the synthesized image 30. The information 37 on the correction image 26 having an inferior image quality due to application to the printer 2 and the image input device 1 is replaced by the information 32 on the original image 22 so that the synthesized or corrected image 30 having no area with inferior image quality can be stored in the memory 12. At the last step 123, the corrected image 30 is registered or stored in the image file 3. In this case, if an operator inputs a new registration key word with the keyboard 6, the corrected image 30 can be registered as a new image different from the original image 22. Alternatively, if the key word used in searching the original image 22 during the pattern matching process is again used, the original image can be replaced by the synthesized image 30. Also, a new key word with slight modification of a part of the key word of the original image 22, such as with a new version number or a renewal history, may be used to store the synthesized image as one of associated images with the original image.

In the above embodiment, as the information of the difference image, only the information present on the correction image and not present on the original image, i.e., only the information added through correction has been used. Contrarily, it is possible to use the information deleted through correction as the information to be processed. In this case, in the process of comparing pixels at corresponding positions of the images 27 and 22 at step 117, two types of difference image are obtained. The first difference image is made of only those black pixels of the image 27 which disagree with the black pixels of the image 22, whereas the second difference image is made of only those black pixels of the image 22 which disagree with the black pixels of the image 27. Next, both the first and second difference images are applied to the noise elimination process at step 119. Lastly, in the synthesizing process at step 121, the first difference image is added to the original image 22 and thereafter, the second difference image is subtracted from the addition result. Namely, the pixels of the original image 22 corresponding to the black pixels of the second difference image are replaced by white pixels to obtain the synthesized image 30.

Further, in the above embodiment, the difference image 29 has been obtained through pattern matching between the original image 22 and the correction image 26. This procedure may be replaced by the following simple method. First, formed at step 103 are an image obtained by adding the rectangular frame 33 to the original image and a rectangular image having only the image information of the rectangular frame 33. Both the images are printed out on two papers, respectively. An operator puts the paper with only the rectangular frame on the paper with the original image 24 to which correction information is added. The upper paper with the original image and correction information is again read with the input image device 1. The normalization process is performed similarly at step 113. With the above procedure, the difference image 29 can be obtained without pattern matching. The key word 34 may be added to the image with only the rectangular frame in order to search the original image at the synthesizing process.

Furthermore, the memories 7 to 12 have been used independently in the above embodiment in consideration of simplifying the description. However, a memory may be used in common in each process to reduce the number of memories.

Figure 10:
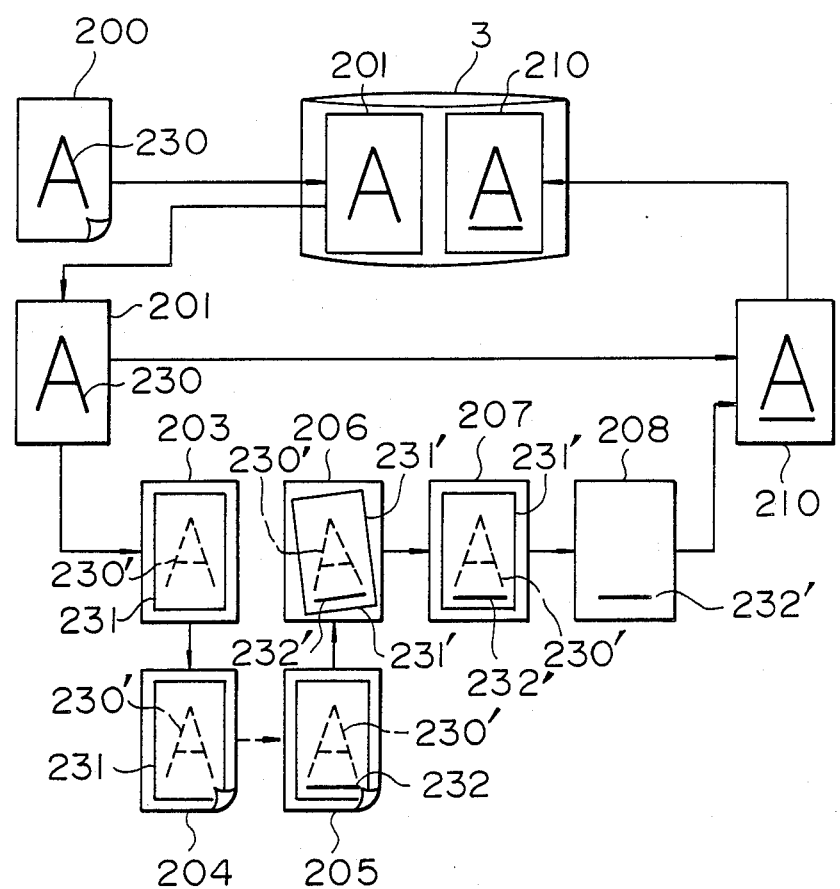
FIG. 10 is a schematic diagram showing the procedure starting from the initial storage of an original image to the re-storage of a corrected image according to a second embodiment of the present invention.

FIG. 10 is a schematic diagram showing the procedure of the initial storage of an original image, correction of the stored image, and the re-storage of a corrected image according to the second embodiment of the present invention.

The image of information 230 (in this example, character A) on a paper 200 is inputted with the image input device 1 and stored in the image file 3 at a preset position as an image 201. As the stored image 201 is required to be partially corrected, the image number, key word or the like are designated and a search command is inputted from the keyboard 6 to read the stored image from the image file or optical disk 3 and store it in the memory 7. In this embodiment, the information 230 on the original image 201 stored in the memory 7 is converted into dots, and a rectangular frame 231 used for position alignment is added to the original image to form an image 203 and store it in the memory 8. In addition to the rectangular frame 231, re-storage information such as a bar code, a key word made of OCR-B fonts conforming with JIS standards, or the like for image retrieval may be added to the original image. Also, all black pixels outside the frame area may be converted into white pixels during the write operation of the rectangular frame 231 in order to facilitate to detect the frame.

The dot image 203 of the original image is printed out on a paper 204 which is a correction paper on which correction information 232 is added to obtain a correction image 205. The correction image 205 is read with the image input device 1 and stored in the memory 9 as an image 206. The size and inclination of information 230' of the image 206 differ from those of the image 203. As discussed previously, if the pixel density of the printer 2 is higher than that of the image input device 1, the information 230' and frame 231' of the image 206 become larger than those of the image 203. Contrarily, if the pixel density of the printer is higher than that of the image input device 1, the information and frame of the image 206 become smaller than those of the image 203. The inclination of an image is caused by a skew failure while the paper passes through the image input device 1. Similar to the first embodiment, the size and inclination of the image 206 are normalized using the rectangular frame 231' to obtain a normalized image 207 having the same size and inclination as the image 203 and store the normalized image in the memory 10. Thereafter, the dots 230' and rectangular frame 231' of the image 207 are erased to obtain a partial correction image 208 which is then stored in the memory 11. Since the image 208 contains only the correction information 232', a corrected image 210 can be obtained in the memory 12 by synthesizing the image 208 with the image 201. The corrected image 210 is stored in the optical disk 3 as a new image in place of the original image 201. The original image may be left stored in the optical disk to use in forming another corrected image therefrom.

FIG. 11 is a flow chart showing the print procedure for image correction according to the second embodiment. In the flow chart, step 101 searches the image 201 stored in the optical disk 3 and store it in the memory 7, step 102 converts the read-out original image 201 into dots, step 103 adds the re-storage information such as the rectangular frame, and step 105 prints out the image 203 with the frame to obtain the correction paper 204.

FIG. 12 is a flow chart showing the re-storage procedure of a corrected image. In the flow chart, step 311 reads the image of the paper 205, which is obtained by adding a correction on the correction paper 204, with the image input device 1 to obtain the image 206, step 313 normalizes the size and inclination of the image 206 to obtain the image 207, step 314 erases the rectangular frame and dots of the image 207 to obtain the partial correction image 208, step 315 searches the original image corresponding to the normalized image 207, step 321 synthesizes the partial correction image 208 with the original image 202 to obtain the corrected image 210, and step 323 stores the synthesized image 210 in the optical disk 3. Among these steps, steps 311, 313, 315, 321 and 323 correspond to steps 111, 113, 115, 121 and 123 shown in FIG. 4, respectively.

Figure 13:
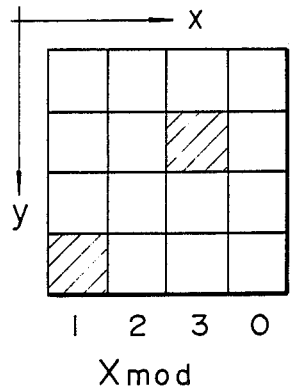
FIGS. 13 and 14 are a pixel layout and a program flow chart, respectively, for use in explaining the dot conversion process for an original image.

Next, the procedure of converting an image into dots at step 102 shown in FIG. 11 will be detailed with reference to FIGS. 13 and 14.

The dot conversion process is a process to thin black pixels within an area where black pixels are consecutively present. For example, all the black pixels except specific dispersed two pixels as shown in FIG. 13 within a 4×4 pixel area are converted into white pixels. It is assumed here that the coordinates of the upper left corner of the original image 201 and the dot image 203 are the coordinate origins, the density of a pixel at the coordinates (x, y) on the original image is defined by $OR(x, y)$, and the density of a pixel at the coordinates (x, y) on the dot image is defined by $OB(x, y)$, where the x-axis is in the right direction, the y-axis is in the down direction, and the interval between pixels is "1". It is further assumed that the density of pixel is represented by a binary value corresponding to white or black.

Figure 14:
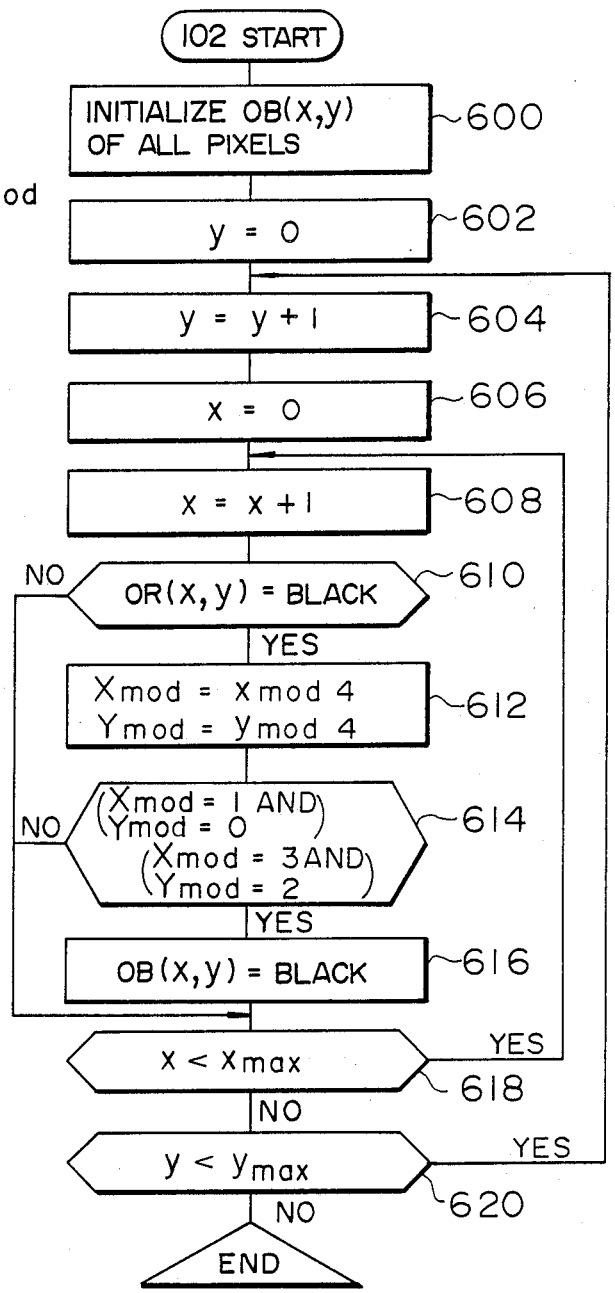

FIG. 14 shows an example of a flow chart for a program to converting the original image into dots under the above-mentioned conditions. First, at step 600 the densities $OB(x, y)$ for all the pixels (x=1 to x-max, y=1 to y-max) within the memory area 8 are initialized to white. At steps 602 to 608, the coordinates (x, y) are incremented to sequentially select the pixels at each row starting from the first row of the image. At step 610 it is checked if the density $OR(x, y)$ of a pixel of the original image at the coordinate (x, y) is white or black. If it is white, the flow advances to judgement step 618 where if it is judged that x is smaller than the maximum value x-max, the flow returns to step 608 to increment the value x. The density of the next pixel is checked and if the value x becomes the maximum value x-max, then it is checked at step 620 if the value y is smaller than the maximum value y-max. If it is y-max, the routine is terminated. If y is smaller than y-max, the flow returns to step 604 to increment the value y and check the density of the first pixel of the next row. If the density OR(x, y) is black, the flow advances to step 612 where the values of x and y coordinates are divided by 4 and the remainders are substituted for variables Xmod and Ymod. The next step 614 is a step to determine if the pixel with OB(x, y) corresponding to a pixel with OR(x, y) is to be changed to white or black. In this embodiment, the density OB(x, y) is set as black (step 116) is Xmod=1 and Ymod=0, or Xmod=3 and Ymod=2, namely, if the pixel with OB(x, y) corresponds to one of the pixels indicated by oblique lines in FIG. 13 within the divided area of 4×4 pixels of the image. If the pixel does not correspond to any one of the two pixels, the pixel is not set as black but the flow advances to step 618 where the coordinate value is checked. Thereafter, the coordinate value is incremented or the routine is terminated as the case may be.

Figure 15:
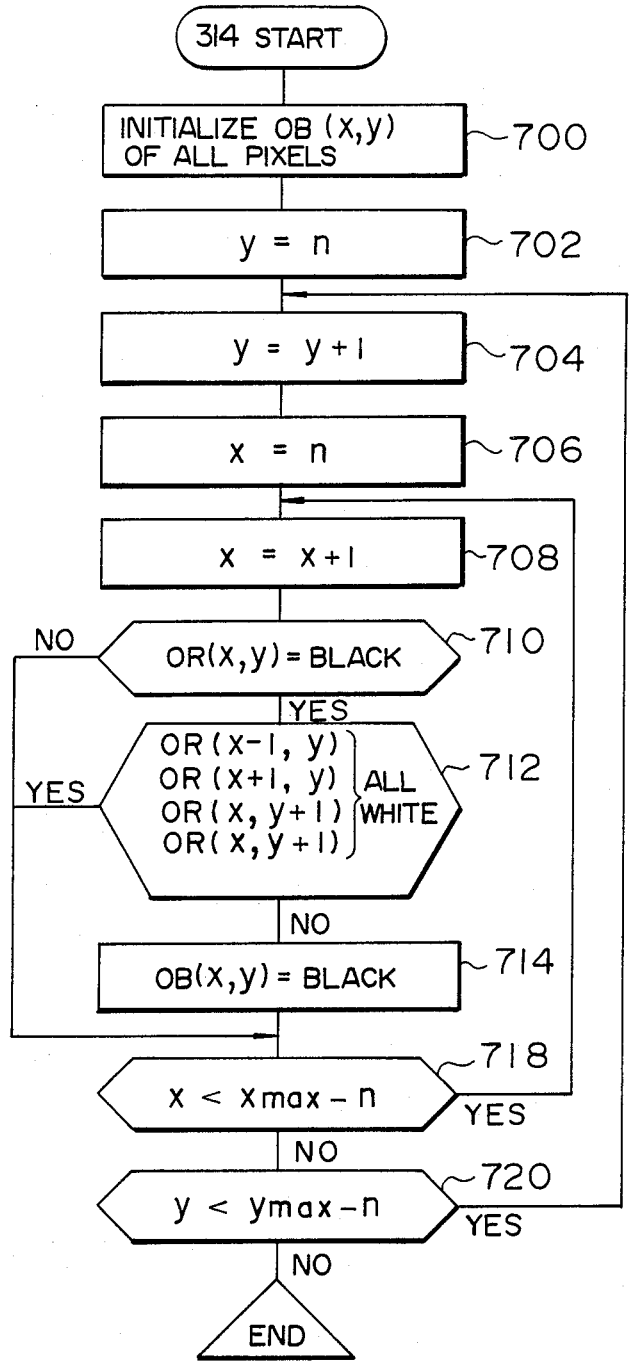
FIG. 15 is a flow chart for a program performing the procedure of erasing dots of the original image.

FIG. 15 is an example of a flow chart for a program erasing dots at step 314 shown in FIG. 12. It is assumed here that the density of a pixel at the coordinates (x, y) of the dot image 207 is defined by OR(x, y), the density of a pixel at the coordinates (x, y) of the erased dot image 208 is defined by OB(x, y), and the coordinate system is the same as that shown in FIG. 13. In the flow chart shown in FIG. 15, similar to steps 600 to 608, 618 and 620 shown in FIG. 14, steps 700 to 708, 718 and 720 initializes the area (memory area 11) storing the erased dot image 208, and increments the coordinate value (x, y). However, in this case, the initial and maximum values of the coordinates x and y are added with a constant n or subtracted by a constant n, respectively, in order to limit the variable range of the coordinates x and y so that the image with the erased rectangular frame is stored in the memory 11. At step 710 it is judged if the density OR(x, y) of a pixel in the dot image is white or black. If it is white, the flow advances to step 718 where the coordinate x is checked. If the pixel with OR(x, y) is black, the flow advances to step 712 where the densities of upper, lower, right and left adjacent pixels are checked. If all the adjacent pixels are white, then the pixel with OR(x, y) is judged as an isolated black pixel, i.e., a dot pixel. The flow advances to step 718 so that the dot pixel is erased. Alternatively, if at least one of the four adjacent pixels is black, it is judged that the pixel with OR(x, y) together with the adjacent pixels constitutes a part of the correction (addition) information 232. In this case, the pixel with OB(x, y) is set as black, and the flow advances to step 718.

In the above embodiments, a dot is made of a single isolated pixel. However, if the original information is desired to be printed out more clearly on the correction paper, the number of pixels constituting a dot may be increased, e.g., the adjacent 2×2 pixels may be arranged in a zig-zag fashion, or at intervals of one pixel or two pixels. Such modifications can be readily realized by slightly changing the contents of step 614 in FIG. 14 and step 712 in FIG. 15.

Figure 16:
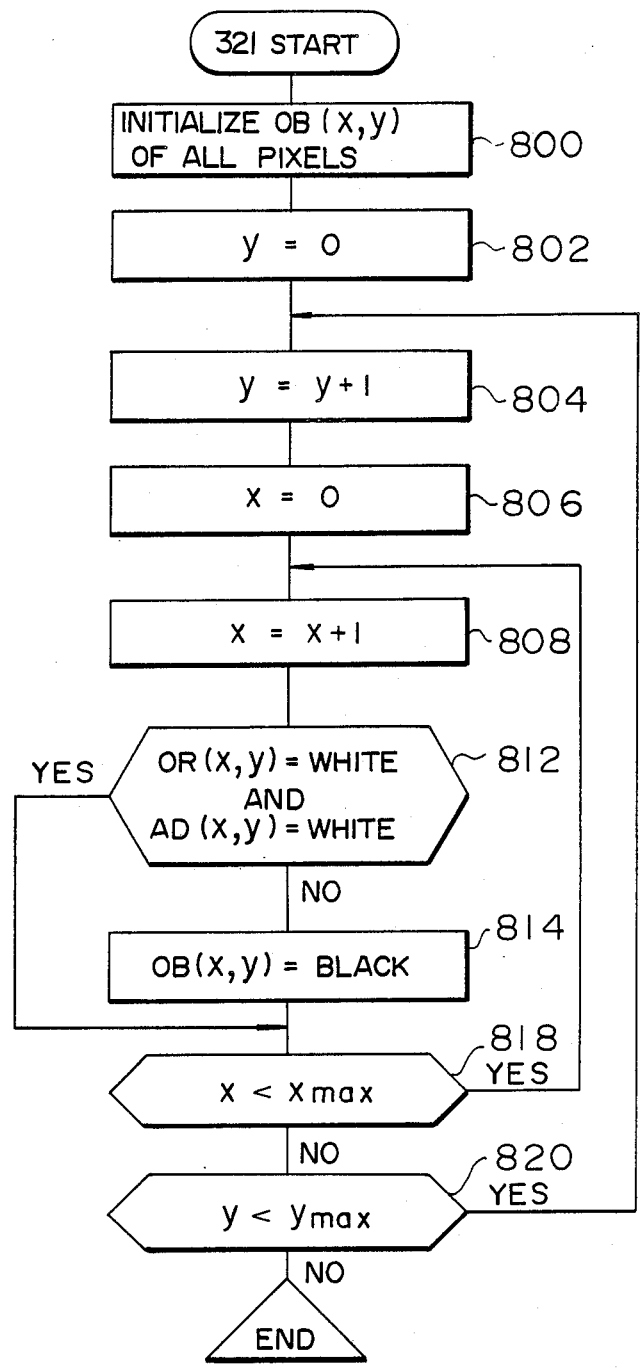
FIG. 16 is a flow chart for a program performing synthesizing the original image with the partial correction image.

FIG. 16 is an example of a flow chart illustrating the synthesizing step 321 shown in FIG. 12 whereby the images 208 and 201 are synthesized to form the new image 210. It is assumed here that the pixel of the original image 201 is defined by OR(x, y), the pixel of the partial correction image 208 is defined by AD(x, y), the pixel of the new corrected image 210 is defined by OB(x, y), and the coordinate system (x, y) is the same as that shown in FIG. 13. In the flow chart shown in FIG. 16, steps 800 to 808, 818 and 820 are similar to the corresponding steps shown in FIG. 14. In this embodiment, all the pixels OB(x, y) of the new corrected image area are initialized to white. At step 812 the pixels OR(x, y) and AD(x, y) are checked. If at least one of them is black, the pixel OB(x, y) is set as black at step 814.

Figure 17:
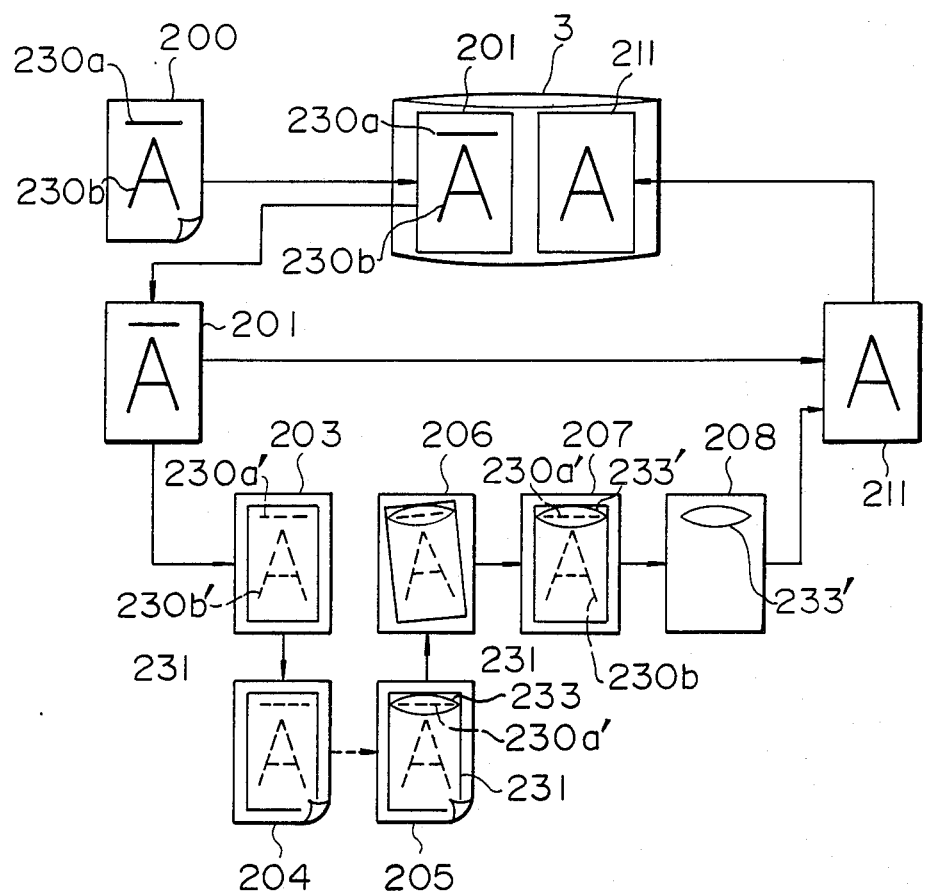
FIG. 17 is a schematic diagram illustrating the procedure of deleting a portion of a stored image according to the present invention.

Next, the third embodiment of the present invention wherein a part of the image information already stored is erased, will be described with reference to FIG. 17. Corresponding elements to those shown in FIG. 10 are represented by identical reference numerals. In this embodiment, the original image stored in the image file contains the information 230a and 230b, and the information 230a is intended to be erased. The procedure that the original image 201 is read out from the image file 3, converted into dots, added with the rectangular frame, and printed out, is the same as that described with the second embodiment. In the present embodiment, in obtaining a new image with a part of the already stored image 201 erased, a mark 233 is added to the correction paper 205 around the portion to be erased, i.e., the portion 230a' outputted in the form of dots, in order to identify the portion to be erased. The correction paper 205 with the mark 233 is read with the image input device and the read image 206 is normalized with respect to the size and inclination thereof using the rectangular frame to obtain a correction paper 207. Thereafter, the dot conversion process described previously is performed to obtain a partial correction image 208 with only the mark 233'. The synthesized image has been obtained in the case of addition correction simply through logical OR operation between the partial correction image 208 and the original image 201. However, in the case of erasure or deletion correction, upon designation of erasure correction from the keyboard 6, it is necessary to have a synthesizing process whereby all pixels of the original image 201 corresponding to those within the encircling mark 233' are converted into white. To realize such a synthesizing process, a routine is inserted between steps 314 and 315 shown in FIG. 12 by which routine all pixels within the encircling mark 233' are converted into black pixels. This routine is executed in the case of the erasure correction. Conversion into black pixels is carried out by scanning the image 208 one line after another, and when a black pixel appears on the scan line (row), converting following white pixels into black pixels until the next black pixel appears. In addition to the above routine, a judgement step 812' is added in parallel with step 812 of the flow chart shown in FIG. 16 which flow chart performs the synthesizing step 321 shown in FIG. 12. If "the density OR(x, y) is white or the density AD(x, y) is black" at step 812', then the flow skips to step 818. In the erasure correction process, if the result of the judgement step 812' is "NO", then step 814 follows.

In the above embodiments, the memory areas 7 to 12 have been provided independently for the purpose of description simplicity. However, in practice, the same memory area can be shared in common for the images 203, 206 and 208, and for the images 207 and 210 so that the image correction process can be carried out with smaller memory areas.

We claim:

1. An image data filing system comprising:
   filing means for storing image data;
   retrieving means for retrieving a first selected portion of the image data which is indicative of at least one figure drawn with a first line quality from the filing means;
   modifying means for modifying the retrieved image data portion into first image data indicative of the at least one figure drawn with a second line quality;
   printing means for receiving the first image data and printing the at least one figure drawn with the second line quality onto a correction paper;
   reading means for converting the at least one figure drawn with the second line quality along with revision markings added thereto from the correction paper into second image data;
   converting means for converting the second image data into third image data by modifying the second image data to remove portions of the second image data indicative of the at least one figure leaving the revision markings having the first line quality; and
   overlaying means for forming corrected image data from the first image data and the third image data.

2. The image data filing system according to claim 1 further comprising a designating means for designating an erasure correction by removing a portion of the retrieved original image data before modifying the retrieved image data portion area specified by the erasure correction.

3. The image data filing system according to claim 1, wherein said printing means outputs the at least one figure drawn with the second line quality with a predetermined position alignment mark on the correction paper, and said modifying means corrects the second image data in accordance with the position alignment mark contained in the second image data and thereafter, performs the second image modifying process.

4. The image data filing system according to claim 2, wherein said printing means outputs the at least one figure drawn with the second line quality with a predetermined position alignment mark on the correction paper, and said modifying means corrects the second image data in accordance with the second image data before modifying the retrieved image data portion the second image modifying process.

5. An image data correcting method comprising:
   operating on first electronic image data indicative of an original image read from a memory with an image lightening algorithm to create lightened electronic image data indicative of the original image with a lightened line quality;
   converting the lightened electronic image data to a printed representation of the original image on a correction paper with the lightened line quality;
   converting the printed original image with lightened line quality together with correction information added on the correction paper to second electronic image data;
   modifying the second image data with an image data modifying process to generate third image data indicative of the correction information with the original information removed; and
   combining the first image data and the third image data to form fourth image data that is indicative of the original image corrected in accordance with the correction information.

6. The image data correcting method according to claim 5, further comprising printing predetermined mark information, on the correction paper, and positioning the second electronic image data in accordance with the mark information contained on the printed representation.

7. The image data correcting method according to claim 6, further comprising adjusting the second electronic image data size in accordance with the mark information.

8. An image data correcting method comprising the steps:
   printing out original information onto a correction paper, the original information being obtained by subjecting first image data read out from an image file to a first conversion process;
   inputting the original information together with correction information added to the correction paper as second image data;
   generating third image data by subjecting the second image data to a second image conversion process, the third image data being the second image data with the original information removed therefrom; and
   forming fourth image data using the first image data and the third image data, the fourth image data being with the first image data partially corrected in accordance with the contents of the third image data,
   wherein said first conversion process converts the original image information of said first image data into dots, and said second conversion process removes dot information contained in said second image data and leaves only non-dot information.

9. The image data correcting method according to claim 8, wherein said original information is printed, together with predetermined mark information, on said correction paper at said printing step, and said second image data is positionally corrected in accordance with said mark information contained on said second image data at said third step.

10. The image data correcting method according to claim 8, wherein said second image data is corrected in accordance with said mark information at said third image data generating step, thereby to adjust the size of an image formed by the second image data.

11. An image data filing system comprising:
    filing means for storing document information in a form of image data;
    first image converting means for converting first image data, which is read out from the filing means, into dotted image data by thinning black pixels of the first image data;
    outputting means for outputting the dotted image data onto a correction sheet;
    reading means for reading the information containing correction marking from the correction sheet as second image data;
    data converting means for converting the second image data into third image data including only non-dot information; and,
    overlaying means for overlaying the first image data and the third image data to form corrected image data.

12. The image data filing system according to claim 11 further comprising designation means for designating an erasure correction, and wherein the overlaying means synthesizes and generates the corrected image data by removing a portion of the first image data corresponding to that within an area specified by the third image data.

13. The image data filing system according to claim 11 wherein the outputting means outputs the dotted image data with a predetermined position alignment mark on the correction sheet, and the data converting means corrects the second image data in accordance with the position alignment mark contained in the second image data and thereafter converts the second image data to the third image data.

14. The image data filing system according to claim 12 wherein the outputting means outputs the dotted image data with a predetermined position alignment mark on the correction sheet, and the data converting means corrects the second image data in accordance with the position alignment mark contained in the second image data and thereafter converts the second image data to the third image data.

* * * * *